United States Patent Office 2,739,906
Patented Mar. 27, 1956

2,739,906

ION EXCHANGE RESIN COMPOSITIONS AND PREPARATION OF SAME

Kenneth L. Berry, Hockessin, Del., and Jack R. Caddell, Lewisville, Pa., assignors to E. I. du Pont de Nemours & Company, Wilmington, Del., a corporation of Delaware No Drawing. Application June 5, 1953,
Serial No. 359,964

11 Claims. (Cl. 117—72)

This invention relates to ion exchange resin compositions and a process of preparing same and, more particularly, to particulate ion exchange resin compositions.

Ion exchange resins have achieved importance for effecting chemical reactions. One of the most important types of ion exchange resins is that prepared by synthetic methods from organic chemicals. These synthetic organic ion exchange resins are insoluble and are generally employed in particulate form. The desired anion or cation exchange reaction is customarily carried out by passing a liquid containing the material in which exchange is to be brought about, through a bed of the particulate ion exchange resin. This is usually achieved by passing the liquid downward through a bed of the resin, at the bottom of which is provided a suitable means preventing the particulate resin material from being washed out of the bed.

In carrying out operations such as above, frequently the flow of liquid is reversed as in a countercurrent operation or backwashing. This reversal of flow of the liquid is of considerable technical importance for many operations as, for example, the regeneration of an ion exchange resin by countercurrent contacting after the resin has been used to remove ions of one type from an effluent solution. The heretofore known particulate synthetic ion exchange resins have a relatively low specific gravity which is of the order of that of aqueous solutions, generally from about 1.0 to 1.2. Because of the low specific gravity of the resin, there is a strong tendency for the particles of resin to be carried along in the direction of the liquid flow which is a source of appreciable trouble in any countercurrent or backwashing step.

Despite the fact that low specific gravity particulate ion exchange resins are highly inconvenient if not altogether impractical for use in operations involving countercurrent extraction, the art has not suggested any change in the ion exchange resin compositions to remedy this situation. Quite to the contrary, the literature teaches the apparent density, i. e., the weight per volume, of these particulate compositions should be reduced. For example, U. S. Patent 2,460,516 discloses depositing ion exchange resins upon and within porous inert materials having a very light weight and an extremely large surface area per unit weight of the material. It is obvious that such a resinous product could not be utilized in simple countercurrent extraction with aqueous solutions since the solutions would have a greater effective density than that of the resin composition and would carry the resin composition particles from the column in which the bed of the ion exchange resin composition is positioned.

An object of the present invention is to provide a new and improved particulate ion exchange resin composition. A further object is to provide such a composition having a higher specific gravity and weight per volume than possessed by heretofore known ion exchange resin compositions. Other objects will be apparent from the description of the invention given hereinafter.

The above objects are accomplished according to the present invention by coating particles of an inert, water-insoluble, inorganic solid having a weight of at least 75 lb./cu. ft. and a specific surface of not over 250 cm.$^2$/g., with an ion exchange resin to obtain a particulate ion exchange resin composition having a specific gravity of at least 1.5 and being composed of these particles at least partially coated with an ion exchange resin.

A preferred method for the preparation of the instant particulate ion exchange resin composition comprises coating the particles of the inert, water-insoluble, inorganic solid which advantageously can be globular particles of a siliceous solid, for example, glass beads, having diameters of the order of 0.01 to 0.5 cm., with an organosilane such as vinyltrichlorosilane and thereafter depositing a coating of an ion exchange resin upon the coated surface of the particles. In more detail, it is preferred to agitate the particles coated with the organosilane in an aqueous medium having dispersed therein a fusible organic polymer adapted to be cross-linked to give an insoluble, infusible resin, subjecting this mixture to polymerization conditions whereby the organic polymer adhering to the particles is converted to a coating of an insoluble, infusible resin, and thereafter converting the resin to an ion exchange resin.

In a preferred form, the particulate ion exchange resin composition of this invention has a specific gravity of at least 1.5 and is composed of globular particles of a siliceous solid having a weight of 85 to 150 lb./cu. ft., a specific surface of 4 to 100 cm.$^2$/g., and diameters of the order of 0.01 to 0.5 cm., the particles having a base coating of an organosilane and an outside coating of an ion exchange resin at least 25 microns in thickness, the ion exchange resin amounting to 20% to 60% by weight of said composition and having an exchange capacity of 1.5 to 10 meq./g. and the coated particles having an exchange capacity of 0.2 to 7.5 meq./g.

The following example in which all parts are by weight unless otherwise stated, illustrates a specific embodiment of the invention.

*Example*

Glass beads approximately 0.65 cm. in diameter were wet with vinyltrichlorosilane and the excess vinyltrichlorosilane evaporated. Thirty-eight parts of the treated beads were placed in a mixture of 37 parts of styrene, 1 part of approximately 40% divinylbenzene in ethylvinylbenzene and 0.25 part of alpha,alpha'-azobis(alpha, gamma,gamma-trimethylvaleronitrile) which was heated for about 10 hours at 35° C. under nitrogen until the liquid component became viscous and appeared to be at the point of incipient gelation. There was then added 0.1 part of alpha, alpha'-azobis(alpha,gamma-dimethylvaleronitrile) and the whole mixture was placed in a solution of 10 parts of methyl cellulose ("Methocel," 4000 cps.) in 400 parts of water which had been deaerated and blanketed by nitrogen. The resulting mixture was agitated by tumbling the vessel end over end for several minutes until the beads and organic phase became dispersed. The mixture was then heated for 4 hours at 60° C. and 2 hours at 100° C. to complete the polymerization of the polymer to the insoluble, infusible stage. The mixture was then diluted with water and the polymer-coated beads were recovered by washing with water, dried, and screened (8 mesh) to remove aggregates. The polymer-coated beads were treated in boiling water for about one hour to remove a trace of styrene. They were then dried and placed in ethylene dichloride (density=1.26) and the material which floated, was discarded. The product was next dried and placed in methyl iodide (density=2.28) and the material which sank, was discarded. There was very little of either of these unwanted fractions.

The polymer-coated beads were then baked overnight in vacuum at 86° C., placed in 95% sulfuric acid for 60 hours at room temperature, and then heated 15 minutes in the acid at 110–120° C. This step converts the polymer coating on the glass beads to an ion exchange resin by sulfonation. The mixture was cooled and the acid washed away with water. The beads were shaken violently in water and some swollen polymer gel thereby dislodged from the beads and washed away. The beads were recovered by filtration and dried in vacuo overnight at 86° C. Thirty-four parts of ion exchange resin-coated beads were thus obtained.

The particulate ion exchange resin composition composed of the above beads was pyrolyzed and found to contain an average of 32%, by weight of the composition, of ion exchange resin. The glass beads used in this example had a weight of 95 lb./cu. ft. and a specific surface of 38 cm.$^2$/g. The average specific gravity of the individual coated beads was 1.89 while the effective density as measured on a large number of beads, i. e., on a volume basis, was 1.6. By titration with standard alkali, the exchange capacity of the composition was determined to be 0.546 meq./g. and that of the resin was determined to be 1.7 meq./g. A sample of the composition was suspended in water and subjected to violent attrition by high speed stirring for several hours. Microscopic examination of the coated beads after this treatment showed that the resin coating was essentially intact.

It will be understood the above example is merely illustrative and that the invention broadly comprises a particulate ion exchange resin composition having a specific gravity of at least 1.5 and being composed of particles of an inert, water-insoluble, inorganic solid having a weight of at least 75 lb./cu. ft. and a specific surface of not over 250 cm.$^2$/g., the particles being at least partially coated with an ion exchange resin. The invention further comprises the process of preparing the composition as above by coating particles of an inert, water-insoluble, inorganic solid with an ion exchange resin, particularly that specific process in which the particles are first coated with an organosilane before the coating of the ion exchange resin is deposited in the particles.

Any inert, water-insoluble, inorganic solid having the herein specified weight per unit volume and specific surface can be used for the particles to be coated with the ion exchange resin according to this invention. A siliceous solid such as glass beads or sand grains, is preferred, particularly because of ready availability, but other relatively dense, inert materials as, for example, barytes or ilmenite, can be used satisfactorily. The particles are preferably of a more or less globular shape with diameters of the order of 0.01 to 0.5 cm. It is not necessary that the particles be globular but, if not, it is preferred their cross-sectional dimensions will, in general, be within the range of 0.01 to 0.5 cm. Solids having a specific gravity of at least 2.5 and, usually, within the range of 2.5 to 3 are preferred. The apparent density or weight per unit volume on a relatively large scale is a more significant characterization for the particles than is specific gravity for purposes of this invention. The particles, prior to coating, should have a weight of at least 75 lb./cu. ft. and, preferably, from 85 to 150 lb./cu. ft. to give a satisfactory composition according to the present invention.

A further requirement for these particles is that they be non-porous, i. e., inert, impervious particulate, and preferably, granular. The porosity of the particles, prior to coating, can be expressed by a measure of their surface area per unit weight. This is called the specific surface and is expressed generally as square centimeters per gram. The formula for the determination of specific surface (page 1113, Chemical Engineers' Handbook, J. H. Perry, McGraw-Hill, N. Y., 3rd edition, 1950) is:

$$s = (k_s/p)(\Sigma \Delta W D_m^{-1} / \Sigma \Delta W)$$

where $s$ is the specific surface in cm.$^2$/g., $k_s$ is specific-surface shape factor or 6 for spheres, $p$ is density in g./cc., $\Delta W$ is incremental weight in g., and $D_m$ is the mean size of the increment in cm. The specific surface of the particles in this invention should not be over 250 cm.$^2$/g. and, preferably, is between 4 and 100 cm.$^2$/g.

In the particulate composition of this invention, the relatively dense, inert, impervious particles are bonded to, i. e., coated with, a synthetic ion exchange resin. In general, the amount of resin will be from 10% to 65% by weight of the composition and, preferably, is between 20% and 60%. The thickness of the coating is not sharply critical and can be varied widely. Suitable thicknesses are from 25 microns to a few hundred microns, e. g., 300. It is not essential that the resin completely coat the dense particle although it should cover at least about 25% of the surface of the particle and, preferably, 50% or more. Bond strength of the resin to the particle is, however, important and this bond strength is increased when the particle is uniformly and completely coated. Hence, in the most preferred embodiment of the invention, the particles are completely coated with a relatively uniform film or coating of the ion exchange resin.

Any synthetic organic ion exchange resin capable of being coated on the inert particles can be used. Such ion exchange resins are well known in the art and have been described in numerous references, for example, Kunin and Myers, "Ion Exchange Resins," Wiley, New York, 1950. Although the example shows a sulfonic acid cation exchange resin, other resins such as carboxylic acid cation exchange resin and basic anion exchange resins can be employed as coatings on the substrate of this invention to give ion exchange resin compositions having a high apparent density. The exchange capacity of the particulate resin composition of this invention is less than the capacity of the resin itself. Thus, the capacity of the ion exchange resins themselves generally vary from about 1.5 to 10 meq./g., whereas the capacity of the resin-coated substrate of this invention will generally be from 0.2 to as high as 7.5 meq./g.

The bond between the synthetic organic ion exchange resin and the inorganic particles should be strong since in commercial use the particles will be subjected to shock, as in stirring. Volume changes which take place in the ion exchange resin due to temperature changes or swelling tend to rupture the bond between the substrate and the resin.

A particularly desirable method of obtaining a particulate ion exchange composition having a high apparent density involves the preliminary coating of the inorganic particles with an organophilic and hydrophobic agent prior to deposition of the ion exchange resin. Suitable reagents for the preparation of the hydrophobic inorganic particles are the chlorosilanes having 1 to 3 chlorine atoms, inclusive, and 1 to 3 hydrocarbon radicals, inclusive, per silicon atom. Particularly preferred are the silanes containing an ethylenic double bond such as in vinyltrichlorosilane and, in general, any silane such as $R_nSiCl_{4-n}$, wherein $n$ is an integer of 1 to 3, inclusive, and R is a hydrocarbon radical of up to 6 carbons. Useful hydrophobic agents include dimethylvinylchlorosilane, dipropylpropenylchlorosilane, divinyldichlorosilane, phenylvinyldichlorosilane, and methylvinyldichlorosilane.

Any known organophilic and hydrophobic agent will aid in the production of a strong bond between the inorganic substrate and the organic ion exchange resin. It is simple to test the dense inorganic particles for hydrophilic or hydrophobic properties. This is determined by their preferential wetting by water or by organic liquids. Such preliminary treatment is not required for the general purpose of this invention provided that suitable bonds between the resin and the inorganic particle are otherwise obtained.

In the process of obtaining the ion exchange resin coating on the inorganic particles, it is preferred that the organic polymer coat the particle as uniformly as possible prior to its crosslinkage to insoluble, infusible resin. When such a uniform coating is obtained, bond strength of the resin to the substrate need not be as high as when the coating does not cover all of the surface of the particle. A particularly preferred method of carrying out this bonding of resin to substrate involves prior polymerization to the point of incipient gelation of the organic polymer composition prior to its dispersion in an aqueous medium followed by addition of the organophilic particles. Agitation of this mixture followed by complete polymerization to the point of insolubility and infusibility of the organic polymer gives a coated particle. After treatments, such as sulfonation or amination well known in the art, gives the cation or anion exchange resin. When the coating is carried out in this manner, the dispersing medium is preferably viscous and does not dissolve the organic components. The dispersing medium should be noninhibitory to polymerization and readily removed from the product. Suitable dispersing media are aqueous methylcellulose, carboxymethylcellulose and polyvinyl alcohol solutions and aqueous suspensions of colloidal clays such as bentonite.

The particulate ion exchange resin composition of this invention is highly desirable for effecting ion exchange in continuous countercurrent operations. Due to its high apparent density, this composition resists displacement from its bed by countercurrent flow without the aid of mechanical restraining means and is thus more convenient and practical to use than the heretofore known particulate ion exchange resin compositions of density little, if any, greater than the liquids passing through the bed of the particulate composition. A specific example of continuous countercurrent operation is the deionization of water or the purification of brackish water by passing it through beds of the particulate ion exchange resin composition of the present invention. The instant composition is also useful for cocurrent operations for ion exclusion as well as ion exchange.

An unexpected property of the ion exchange resin composition of this invention is its exchange capacity. As indicated previously, this capacity is somewhat less than the capacity of the resin itself but not to the extent that would have been anticipated. The teaching of the art was generally that the extent of surface of resin exposed to the liquid under treatment was a dominating factor in determining the exchange capacity and, therefore, the ion exchange resin should be deposited on highly porous materials which are light in weight and have an extremely large surface area per unit weight of material. But in the instant invention, the exposed surface of resin per unit weight of composition is low and yet the exchange capacity is not reduced to the point where it would offset the clear advantage of the high apparent density of the instant composition.

As many apparently widely different embodiments of this invention may be made without departing from the spirit and scope thereof, it is to be understood that the invention is not limited to the specific embodiments thereof except as defined in the appended claims.

The invention claimed is:

1. A particulate, ion exchange resin coated, inert solid having a specific gravity of at least 1.5 and being composed of particles of an inert, non-porous, water-insoluble, inorganic solid having dimensions of the order of 0.01 to 0.5 cm., a weight of at least 75 lb./cu. ft. and a specific surface of not over 250 cm.$^2$/g., said particles being at least partially coated with an ion exchange resin.

2. A particulate, ion exchange resin coated, inert solid as set forth in claim 1 wherein said ion exchange resin amounts to 10% to 65% by weight of said composition.

3. A particulate, ion exchange resin coated, inert solid as set forth in claim 2 wherein said particles are substantially completely coated with an ion exchange resin coating at least 25 microns in thickness, said ion exchange resin has an exchange capacity of 1.5 to 10 meq./g., and said coated particles have an exchange capacity of 0.2 to 7.5 meq./g.

4. A particulate, ion exchange resin coated, inert solid having a specific gravity of at least 1.5 and being composed of globular particles of a non-porous siliceous solid having a weight of at least 75 lb./cu. ft. and a specific surface of not over 250 cm.$^2$/g., said particles being at least partially coated with an ion exchange resin.

5. A particulate, ion exchange resin coated, inert solid as set forth in claim 4 wherein said particles have dimensions of the order of 0.01 to 0.5 cm. and said ion exchange resin amounts to 10% to 65% by weight of said composition.

6. A particulate, ion exchange resin coated, inert solid having a specific gravity of at least 1.5 and being composed of globular particles of a non-porous siliceous solid having a weight of at least 75 lb./cu. ft and a specific surface of not over 250 cm.$^2$/g., said particles having a base coating of an organosilane and an outside coating of an ion exchange resin.

7. A particulate, ion exchange resin coated, inert solid having a specific gravity of at least 1.5 and being composed of globular particles of a non-porous siliceous solid having a weight of 85 to 150 lb./cu. ft., a specific surface of 4 to 100 cm.$^2$/g., and diameters of the order of 0.01 to 0.5 cm., said particles having a base coating of vinyltrichlorosilane and an outside coating of an ion exchange resin at least 25 microns in thickness, said ion exchange resin amounting to 20% to 60% by weight of said composition and having an exchange capacity of 1.5 to 10 meq./g. and said coated particles having an exchange capacity of 0.2 to 7.5 meq./g.

8. Process of preparing a particulate, ion exchange resin coated, inert solid which comprises coating particles of an inert, non-porous, water-insoluble, inorganic solid having a weight of at least 75 lb./cu. ft. and a specific surface of not over 250 cm.$^2$/g., with an ion exchange resin.

9. Process of preparing a particulate, ion exchange resin coated, inert solid which comprises coating particles of an inert, non-porous, water-insoluble, inorganic solid having a weight of at least 75 lb./cu. ft. and a specific surface of not over 250 cm.$^2$/g., with an organosilane and thereafter depositing a coating of an ion exchange resin upon the coated surface of said particles.

10. Process as set forth in claim 9 wherein said organosilane is vinytrichlorosilane.

11. Process of preparing a particulate, ion exchange resin coated, inert solid which comprises coating particles of an inert, non-porous, water-insoluble, inorganic solid having a weight of at least 75 lb./cu. ft. and a specific surface of not over 250 cm.$^2$/g., with an organosilane, agitating said coated particles in an aqueous medium having dispersed therein a fusible organic polymer adapted to be cross-linked to give an insoluble, infusible resin, subjecting the resulting mixture to polymerization conditions whereby said organic polymer is converted to a coating of an insoluble, infusible resin on said particles, and thereafter converting said resin to an ion exchange resin.

References Cited in the file of this patent

UNITED STATES PATENTS

| 2,460,516 | Luaces | Feb. 1, 1949 |
|---|---|---|
| 2,631,127 | D'Alelio | Mar. 10, 1953 |
| 2,642,514 | Herkenhoff | June 16, 1953 |